(12) United States Patent
Baldwin et al.

(10) Patent No.: US 9,992,298 B2
(45) Date of Patent: Jun. 5, 2018

(54) RELATIONSHIP-BASED WAN CACHING FOR OBJECT STORES

(71) Applicant: International Business Machines Corporation, Armonk, NY (US)

(72) Inventors: Duane M. Baldwin, Mantorville, MN (US); Nilesh P. Bhosale, Pune (IN); John T. Olson, Tucson, AZ (US); Sandeep R. Patil, Pune (IN)

(73) Assignee: International Business Machines Corporation, Armonk, NY (US)

( * ) Notice: Subject to any disclaimer, the term of this patent is extended or adjusted under 35 U.S.C. 154(b) by 445 days.

(21) Appl. No.: 14/459,691

(22) Filed: Aug. 14, 2014

(65) Prior Publication Data

US 2016/0048551 A1 Feb. 18, 2016

(51) Int. Cl.
H04L 29/08 (2006.01)
(52) U.S. Cl.
CPC ............................ H04L 67/2847 (2013.01)
(58) Field of Classification Search
None
See application file for complete search history.

(56) References Cited

U.S. PATENT DOCUMENTS

| | | | |
|---|---|---|---|
| 5,659,743 A * | 8/1997 | Adams | G06F 3/0601 |
| 7,249,219 B1 | 7/2007 | Mowat et al. | |
| 7,849,269 B2 | 12/2010 | Sundarrajan et al. | |
| 8,381,213 B1 | 2/2013 | Naamad et al. | |
| 8,549,108 B2 | 10/2013 | Kini et al. | |
| 2008/0270462 A1 * | 10/2008 | Thomsen | G06F 17/30545 |
| 2010/0281035 A1 | 11/2010 | Carmel et al. | |
| 2011/0087642 A1 | 4/2011 | Rajamani et al. | |
| 2013/0110790 A1 * | 5/2013 | Matsumoto | G06F 12/00 707/679 |

OTHER PUBLICATIONS

Harrison, CDIA Training & Test Preparation Guide 2000, Specialized Solutions Inc., 68, 69.*
File Storage Hardware and Disk Organization date unknown [captured on Apr. 11, 2003 by archive.org], NTFS.com, http://web.archive.org/web/20030411125108/http://ntfs.com/hard-disk-basics.htm.*
Kozierok, Logical Block Addressing (LBA) Apr. 17, 2001, The PC Guide, http://www.pcguide.com/ref/hdd/bios/modesLBA-c.html.*
Zeng, et al., "SOSS: Smart Object-Based Storage System," Proceedings of the Third International Conference on Machine Learning and Cybernetics, Shanghai, pp. 26-29, Aug. 2004.

* cited by examiner

Primary Examiner — Jason G Liao
(74) Attorney, Agent, or Firm — Nelson and Nelson; Daniel P. Nelson; Alexis V. Nelson (57) ABSTRACT

A method for pre-fetching objects from an object store and storing them in an object cache is disclosed. In one embodiment, such a method includes monitoring access to objects in an object store. The objects have metadata tags, such as user-defined or pre-defined metadata tags, associated therewith. The method further maintains a database for metadata tags associated with the objects, and keeps track of a number of object accesses per metadata tag. In the event a threshold number of object accesses for a particular metadata tag is reached, the method promotes objects having the metadata tag and/or a related metadata tag to an object cache. A corresponding system and computer program product are also disclosed.

20 Claims, 7 Drawing Sheets

112

| Tag | Access Count | Access Timestamp | Related Objects (OIDs) |
|---|---|---|---|
| Shirt | 118 | 07182013115035 | OID102345, OID234010, OID000123 |
| Clothing | 152 | 07152013013510 | OID001748, OID234010, OID403121 |
| Blouse | 13 | 07162013084228 | OID101975 |
| Apparel | 17 | 07192013094532 | OID230569, OID210584, OID000236 |
| Pants | 89 | 07242013031252 | OID025041, OID002059 |

| Tag | Access Count | Access Timestamp | Related Objects (OIDs) |
|---|---|---|---|
| Shirt | 118 | 07182013115035 | OID102345, OID234010, OID000123 |
| Clothing | 152 | 07152013013510 | OID001748, OID234010, OID403121 |
| Blouse | 13 | 07162013084228 | OID101975 |
| Apparel | 17 | 07192013094532 | OID230569, OID210584, OID000236 |
| Pants | 89 | 07242013031252 | OID025041, OID002059 |

RELATIONSHIP-BASED WAN CACHING FOR OBJECT STORES

BACKGROUND

Field of the Invention

This invention relates to systems and methods for caching objects in object stores.

Background of the Invention

Object storage, also referred to as object-based storage, is an approach for addressing and manipulating discrete units of storage referred to as objects. Object storage is significantly more scalable than traditional file systems in large part because it is much simpler. Like files in a file system, objects contain data. However, unlike files in a file system, objects are not constrained within a hierarchy. Every object is assigned a unique identifier and is stored at the same level in a flat address space. Because the hierarchy is eliminated, an object cannot be placed inside another object as occurs in a conventional file system. Among other benefits, object storage systems typically require less metadata than file systems to store and access files. Overhead associated with managing file metadata is also reduced by storing metadata with the object.

Although object-based storage systems address how data is stored, issues still remain as to how the data is distributed to users. In the current environment, it is not unusual for a large organization to have millions or even billions of files or other data objects stored on various types of storage media, and to have employees, partners, and clients located all over the world. Each of these users may require fast, efficient, and often shared access to the organization's data. In order to provide desired data access, many organizations have turned to storing objects in the "cloud" as a way to scale storage capabilities and provide large amounts of data to more users in more places. Such cloud-based systems typically require a highly efficient storage infrastructure to support such large-scale and potentially global operations.

In view of the foregoing, what are needed are systems and methods to more efficiently provide data objects to users in large-scale operations. Ideally such systems and methods will provide fast, efficient, and possibly shared access to an organization's data.

SUMMARY

The invention has been developed in response to the present state of the art and, in particular, in response to the problems and needs in the art that have not yet been fully solved by currently available systems and methods. Accordingly, improved systems and methods are disclosed for pre-fetching objects from an object store for storage in an object cache. The features and advantages of the invention will become more fully apparent from the following description and appended claims, or may be learned by practice of the invention as set forth hereinafter.

Consistent with the foregoing, a method for pre-fetching objects from an object store and storing them in an object cache is disclosed. In one embodiment, such a method includes monitoring access to objects in an object store. The objects have metadata tags, such as user-defined or pre-defined metadata tags, associated therewith. The method further maintains a database for metadata tags associated with the objects, and keeps track of a number of object accesses per metadata tag. In the event a threshold number of object accesses for a particular metadata tag is reached, the method promotes objects having the metadata tag and/or a related metadata tag to an object cache.

A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 1:
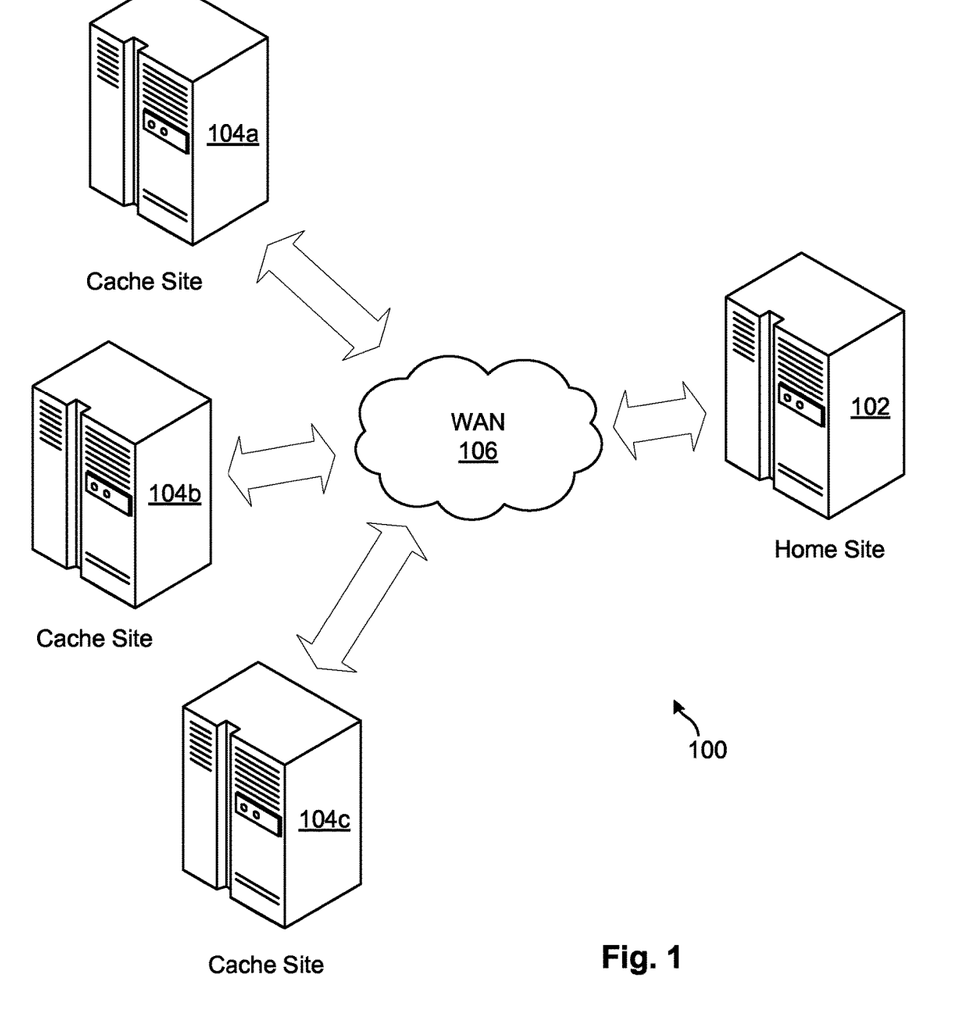
FIG. 1 is a high-level block diagram showing one example of WAN caching in a cloud-based object storage system.

Referring to FIG. 1, one example of a cloud-based object storage system 100 that implements WAN caching is illustrated. The cloud-based object storage system 100 is presented by way of example and not limitation. In the illustrated embodiment, the cloud-based object storage system 100 includes a home site 102 and one or more cache sites 104a-c communicating through a wide area network 106. In certain embodiments, each of the home site 102 and cache sites 104 are made up of computer clusters that comprise loosely or tightly coupled computers that work together as a single system. Nevertheless, the home site 102 or cache sites 104 may include a single or multiple computers.

The home site 102 may store a primary copy of data objects in the cloud-based object storage system 100. The cache sites 104, by contrast, may be located at remote sites to cache (i.e., store a copy of) data located at the home site 102. The cache sites 104 may enable data to be located closer to end users at various locations, thereby improving the I/O performance of the data. In certain embodiments, the wide area network 106 may have bandwidth limitations or latency issues that may prevent data from being accessed directly from the home site 102 with the same speed or efficiency as it may be accessed from the cache sites 104.

When a user or application attempts to access an object through a cache site 104 and the cache site 104 does not already store a copy of the object, the cache site 104 may retrieve the object from the home site 102 and store it in cache. The object will then be available to the user or application or other users or applications if the object needs to be accessed again. If a user or application writes to the object, the object may be modified in the cache and asynchronously destaged to the home site 102 either immediately or at a later time.

In certain embodiments in accordance with the invention, data objects may be pre-fetched from the home site 102 and stored in the cache sites 104 in anticipation of their access by end users proximate the cache sites 104. This may avoid bandwidth limitations or latency issues associated with accessing data objects from the home site 102 through the wide area network 106. Various techniques for pre-fetching data objects from the home site 102 and storing them at the cache sites 104 are described in FIGS. 2 through 5. Each of these techniques pre-fetches data objects based on the metadata tags of data objects that are accessed. User-defined or application-defined metadata tags are a strong differentiator of object storage from other types of data storage, such as traditional file systems.

The disclosed pre-fetching techniques rely on the principle that if data objects with certain metadata tags are accessed (i.e., read or written to), other data objects with the same or related metadata tags are also likely to be accessed (i.e., read or written to). That is, the metadata tags of data objects may be used to infer relationships between objects. Rules, such as will be described in association with FIGS. 2 through 5, may be established to infer relationships between objects based on the values of their metadata tags. Such rules may be user-defined, factory pre-defined, or a combination of the two. Data objects that are related to one another may be pre-fetched from the home site 102 and stored in a cache site 104 in anticipation of their future access by end users or applications. Pre-fetching may occur at irregular intervals, such as when certain thresholds are reached or relationships are inferred, at pre-established times (e.g., every hour), or when conditions are optimal (e.g., when wide area network 106 traffic or latency is low or when usage of a cache site 104 or home site 102 is low). Using the smart pre-fetching techniques disclosed herein, access patterns of data objects having particular metadata tags may be identified in order to identify other data objects, having the same or related metadata tags, that are likely to be accessed in the future.

In certain embodiments, various statistics and other information may be maintained for metadata tags of accessed objects and, based on the statistics, decisions may be made with regard to pre-fetching other data objects from a home site 102. For example, in one embodiment, an access count may be maintained for each metadata tag in a cloud-based object storage system 100. When a data object having a metadata tag is accessed, the access count for the metadata tag may be incremented. Similarly, in other embodiments, when an object having a metadata tag is accessed, a timestamp may be recorded for the metadata tag. Based on these statistics, decisions may be made with regard to which data objects are pre-fetched from a home site 102 and stored at a cache site 104. For example, using the statistics discussed above, a rule may be established to cache objects having one or more of the N most frequently used metadata tags.

In certain embodiments, different statistics may be maintained for each cache site 104 in a cloud-based object storage system 100. This is because each cache site 104 may have different object access patterns or characteristics. For example, users communicating with a first cache site 104a may primarily access data objects having a first set of metadata tags whereas users communicating with a second cache site 104 may primarily access data objects having a second set of metadata tags. This will result in differing statistics for the first and second cache sites 104a, 104b. As a result, objects that are pre-fetched for storage at a first cache site 104a may differ from objects that are pre-fetched for storage at a second cache site 104b.

Figure 2:
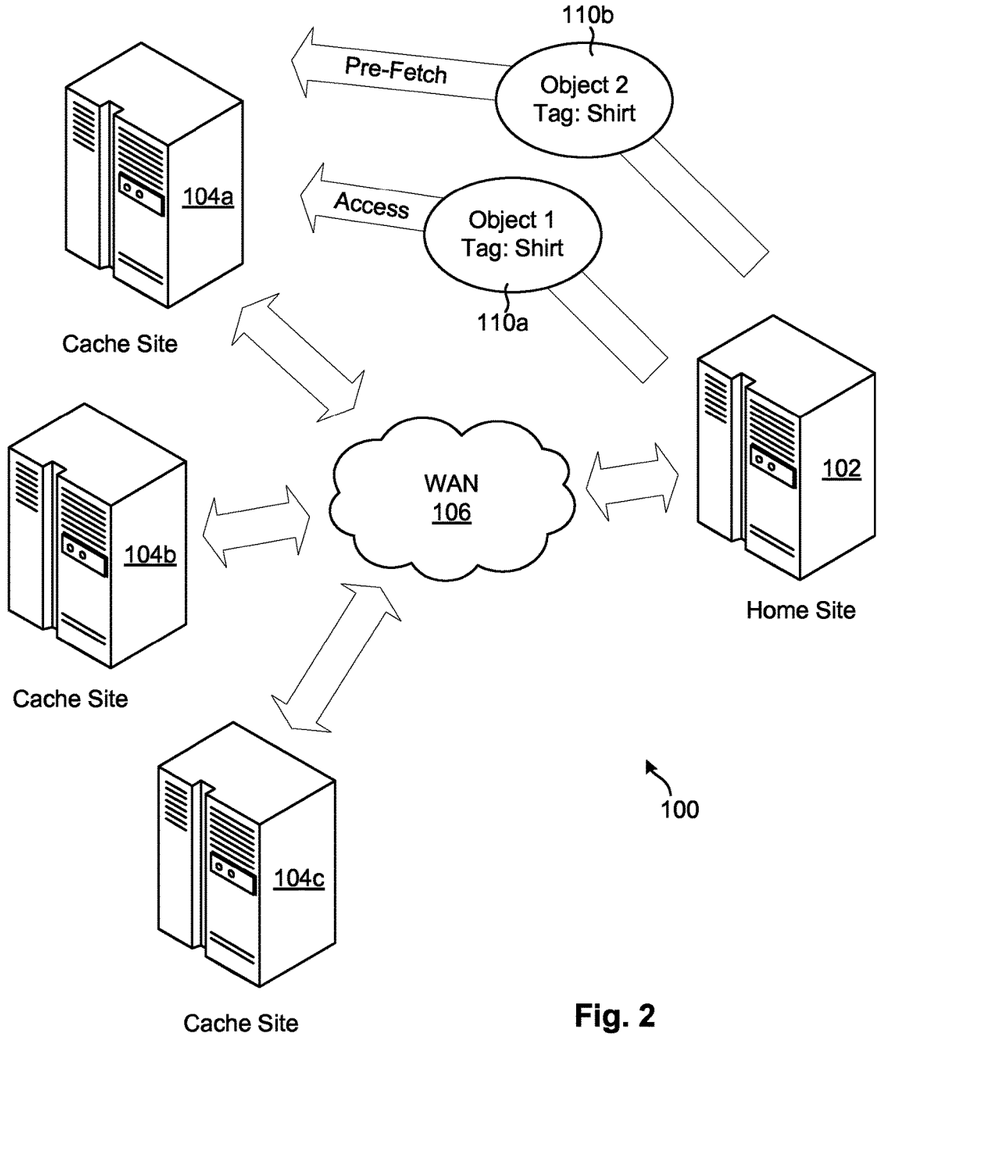
FIG. 2 is a high-level block diagram showing a first technique for pre-fetching objects from a home site for storage at a cache site.

Referring to FIG. 2, a first technique for pre-fetching objects from a home site 102 for storage at a cache site 104 is illustrated. To illustrate this technique, assume that an object 110a having the metadata tag "shirt" is accessed at a cache site 104a. This object 110s may be accessed from the cache site 104a or accessed from the home site 102 over the wide area network 106. If not already stored at the cache site 104a, the object 110a may be stored at the cache site 104a. Based on statistics gathered for the metadata tag "shirt," assume that a determination is made that other data objects with the same metadata tag are likely to be accessed in the future at the cache site 104a. As a result, other data objects with the same metadata tag (such as the object 110b having the metadata tag "shirt") are pre-fetched from the home site 102 and stored at the cache site 104a.

Figure 3:
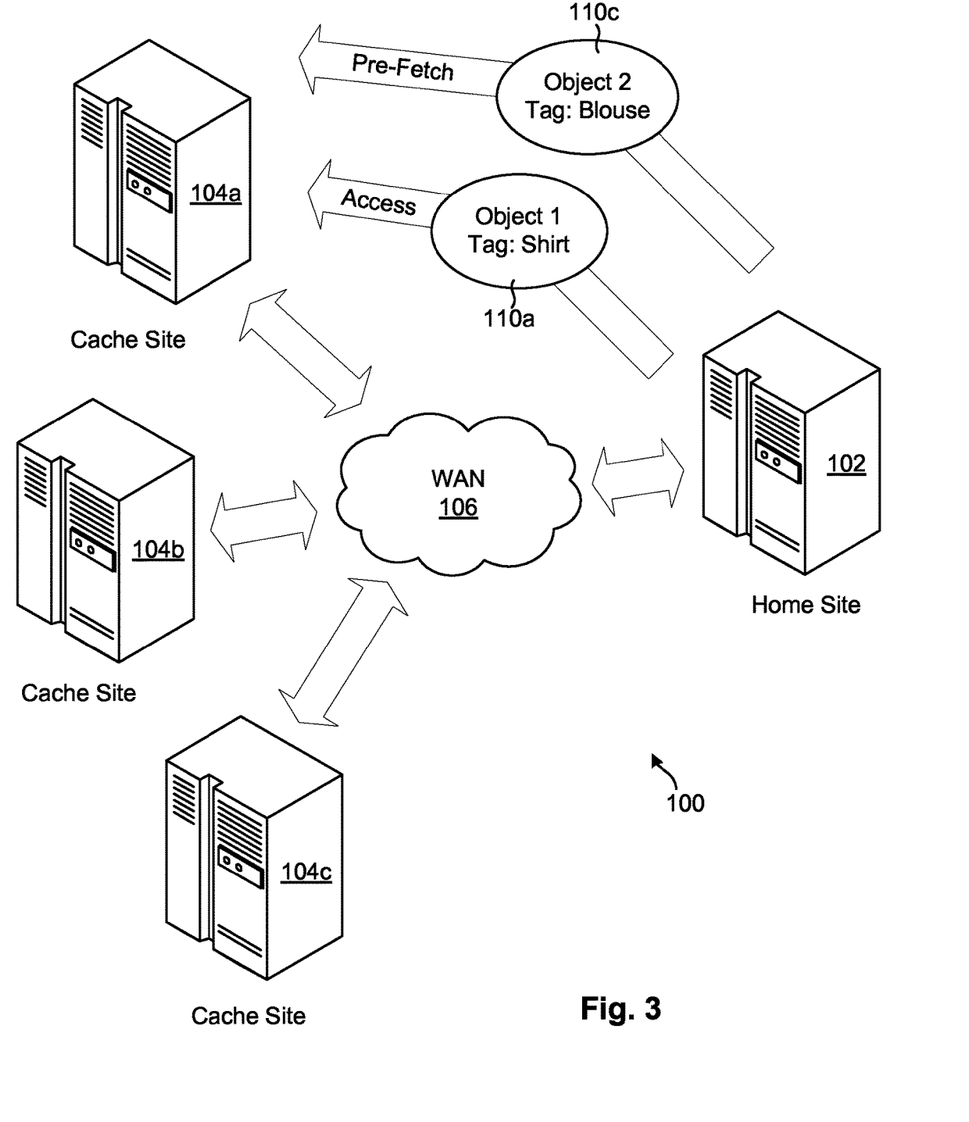
FIG. 3 is a high-level block diagram showing a second technique for pre-fetching objects from a home site for storage at a cache site.

Referring to FIG. 3, a second technique for pre-fetching objects from a home site 102 for storage at a cache site 104 is illustrated. As previously mentioned, relationships between objects may be inferred based on their metadata tags. As shown in FIG. 3, if a first object 110a having the metadata tag "shirt" is accessed at the cache site 104a and it is anticipated that other related objects 110 may also be accessed at the cache site 104a or another cache site 104b, synonyms may be used to identify related objects. For example, a second data object 110c having the metadata tag "blouse" (a synonym of "shirt") may be pre-fetched from the home site 102 and stored at the cache site 104a. Thus, metadata tags that are synonyms of one another may, in certain embodiments, be used to infer relationships between objects 110 for pre-fetching purposes. In certain embodiments, a dictionary provided by a service or other software may be used to determine whether metadata tags are synonyms of one another.

Figure 4:
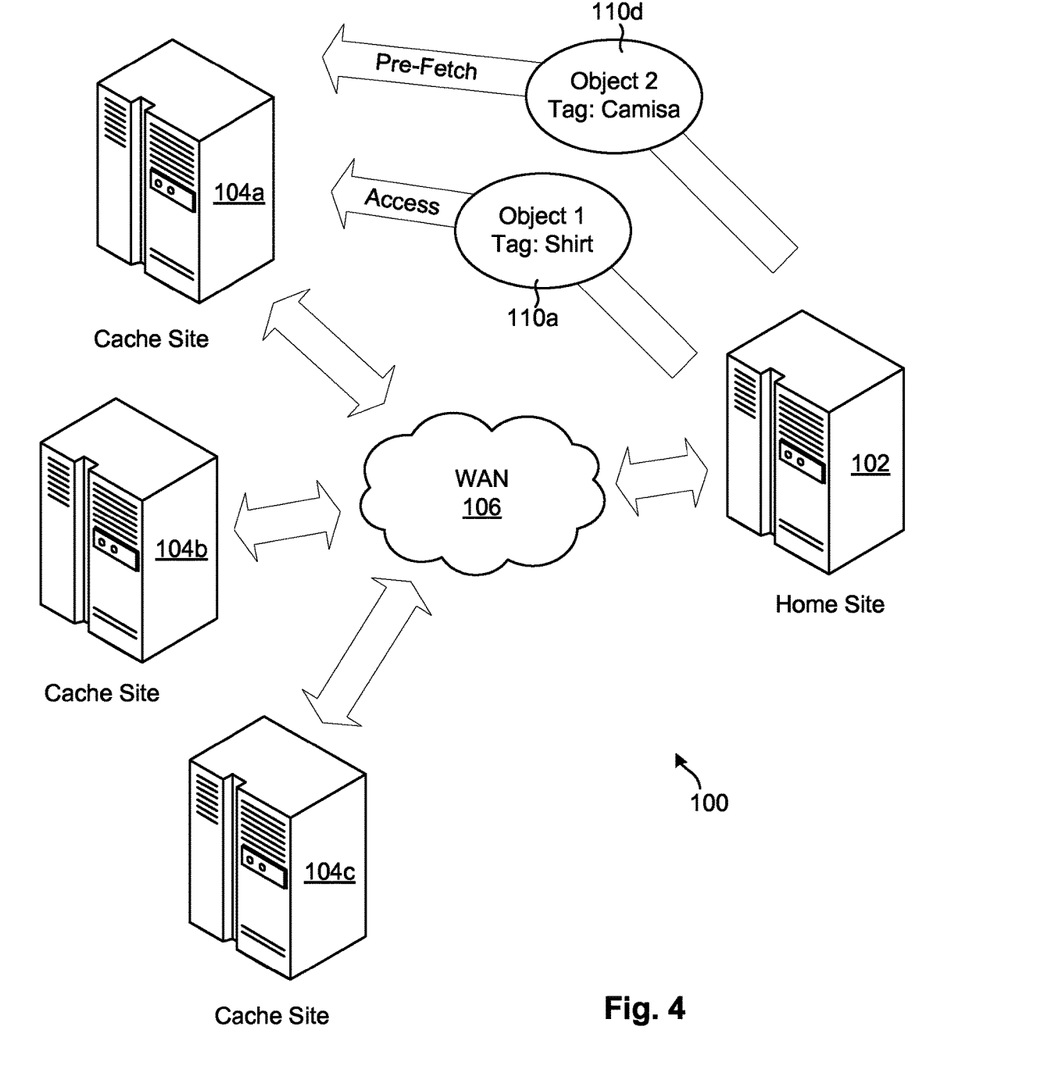
FIG. 4 is a high-level block diagram showing a third technique for pre-fetching objects from a home site for storage at a cache site.

Referring to FIG. 4, a third technique for pre-fetching objects from a home site 102 for storage at a cache site 104 is illustrated. In this example, assume that a first object 110a having the metadata tag "shirt" is accessed at the cache site 104a and it is anticipated that other related objects 110 may also be accessed at the cache site 104a or another cache site 104b. Using this technique, translations may be used to identify related objects for pre-fetching purposes. For example, a second data object 110d having the metadata tag "camisa" (the spanish translation of "shirt") may be pre-fetched from the home site 102 and stored at the cache site 104a. Thus, in certain embodiments, metadata tags that are translations of one another may be used to infer relationships between objects 110 for pre-fetching purposes. Such a feature may be useful where a first cache site 104a serves a first locale primarily speaking a first language and a second cache site 104b serves a second locale primarily speaking a second language, or where a cache site 104 serves locales speaking multiple languages. In certain embodiments, translation software or a translation service may be used to translate metadata tags.

Figure 5:
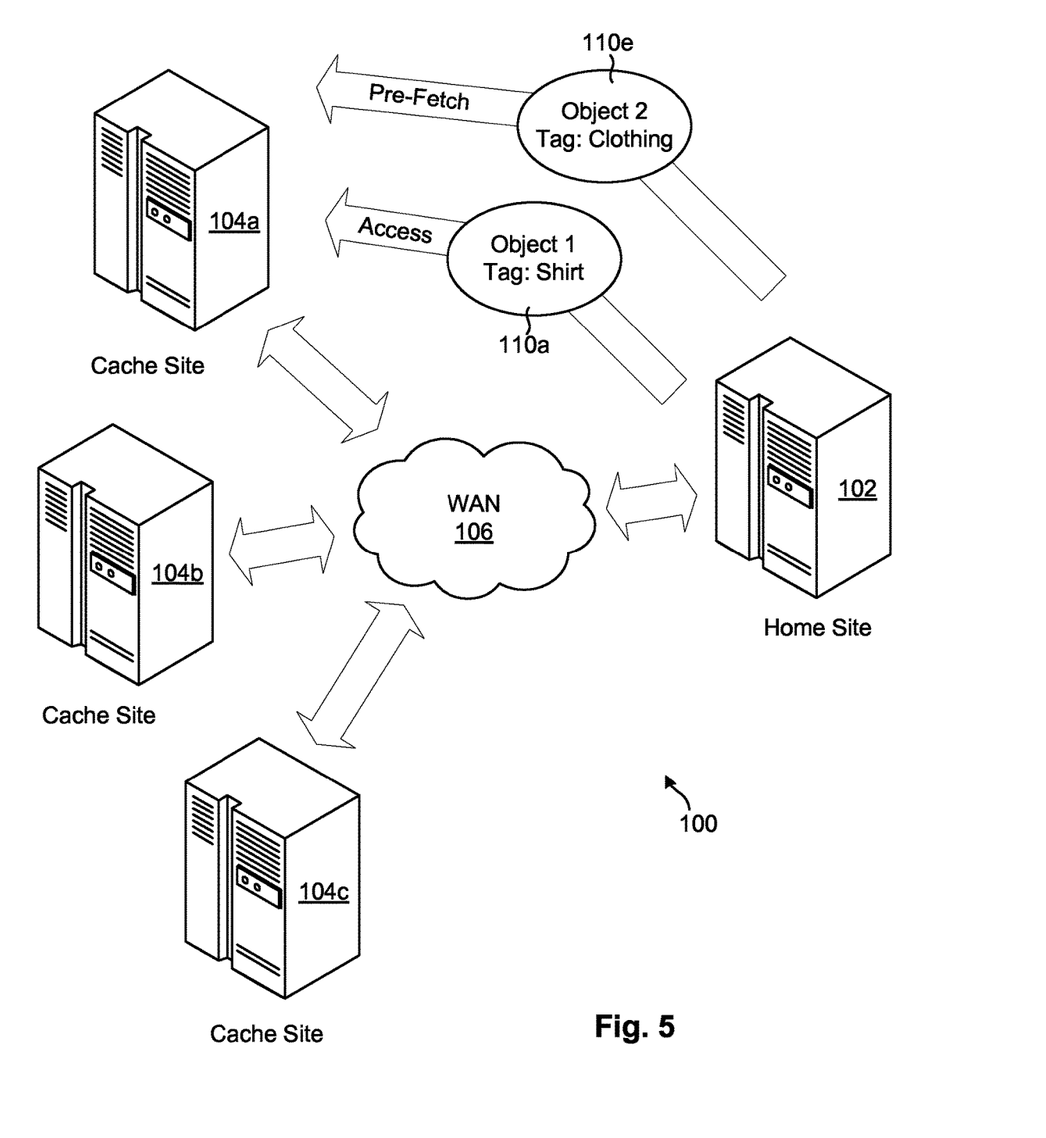
FIG. 5 is a high-level block diagram showing a fourth technique for pre-fetching objects from a home site for storage at a cache site.

Referring to FIG. 5, a fourth technique for pre-fetching objects from a home site 102 for storage at a cache site 104 is illustrated. In this example, assume that a first object 110a having the metadata tag "shirt" is accessed at the cache site 104a and it is anticipated that other related objects 110 will be accessed at the cache site 104. In this example, hierarchical relationships (e.g., where one metadata tag is a subset of another metadata tag or a category of another metadata tag, or vice versa) between objects may be considered. For example, a second data object 110e having the metadata tag "clothing" (where "shirt" is a subset of "clothing" or a category of "clothing") may be pre-fetched from the home site 102. Thus, metadata tags that are hierarchically related to one another may also be used to infer relationships between objects 110 for pre-fetching purposes.

Figure 6:
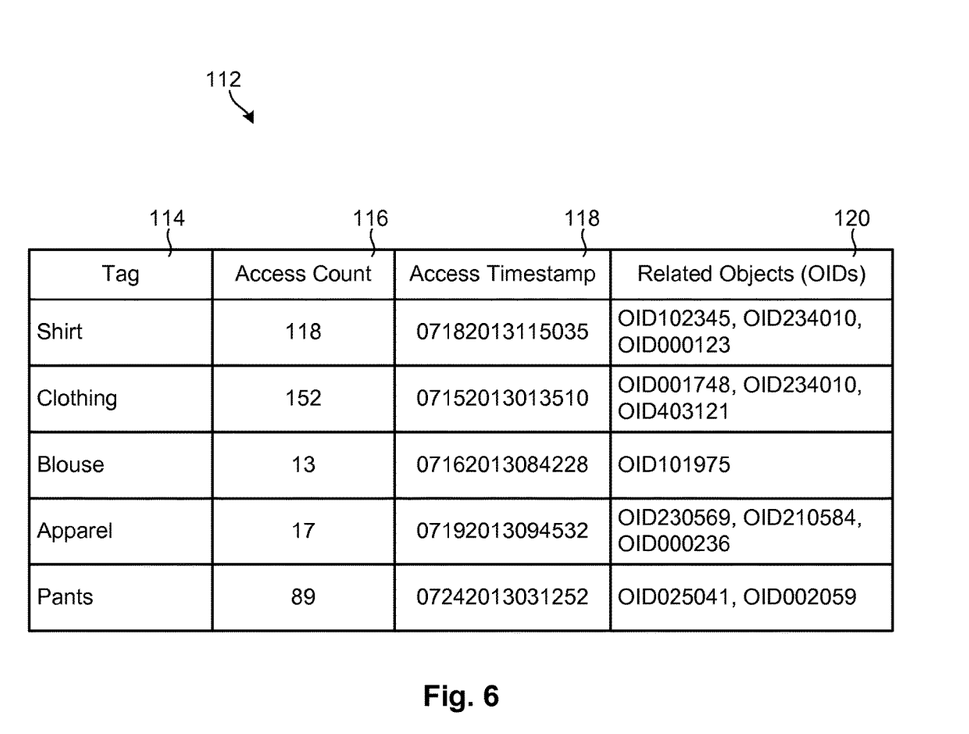
FIG. 6 is an example of a database table for storing information about metadata tags associated with objects.

Referring to FIG. 6, in certain embodiments in accordance with the invention, a database may be maintained to record statistics and other information about metadata tags in the object storage system 100. The database may be maintained at a home site 102, a cache site 104, or a combination thereof. FIG. 6 shows one example of a database table 112 that may be maintained in such a database. As shown, the table 112 includes columns identifying a metadata tag 114, an access count 116 indicating a number of times an object with the metadata tag has been accessed, and an access timestamp 118 indicating the last time an object having the metadata tag was accessed (in the illustrated example, the access timestamp 118 is in the format MMDDYYYYH-HMMSS). In certain embodiments, the database table 112 may also include a column identifying related objects. For example, using the rules (e.g., synonym, translation, and hierarchical relationship rules) discussed in association with FIGS. 2 through 5, objects 120 having metadata tags that are either the same or similar to the metadata tag 114 may be listed in the column.

The database table 112 is presented by way of example and not limitation. Other types of information may be included in (or removed from) the table 112. For example, in certain embodiments the database table 112 may also store information about the frequency with which objects with a given metadata tag are accessed. Thus may include counting the number of accesses over a given time period. Such information may be helpful to determine which objects to promote to a cache site 104. In other embodiments, synonyms, translations, hierarchical relationship information, or the like, may also be stored in the database table 112 or another related database table.

Figure 7:
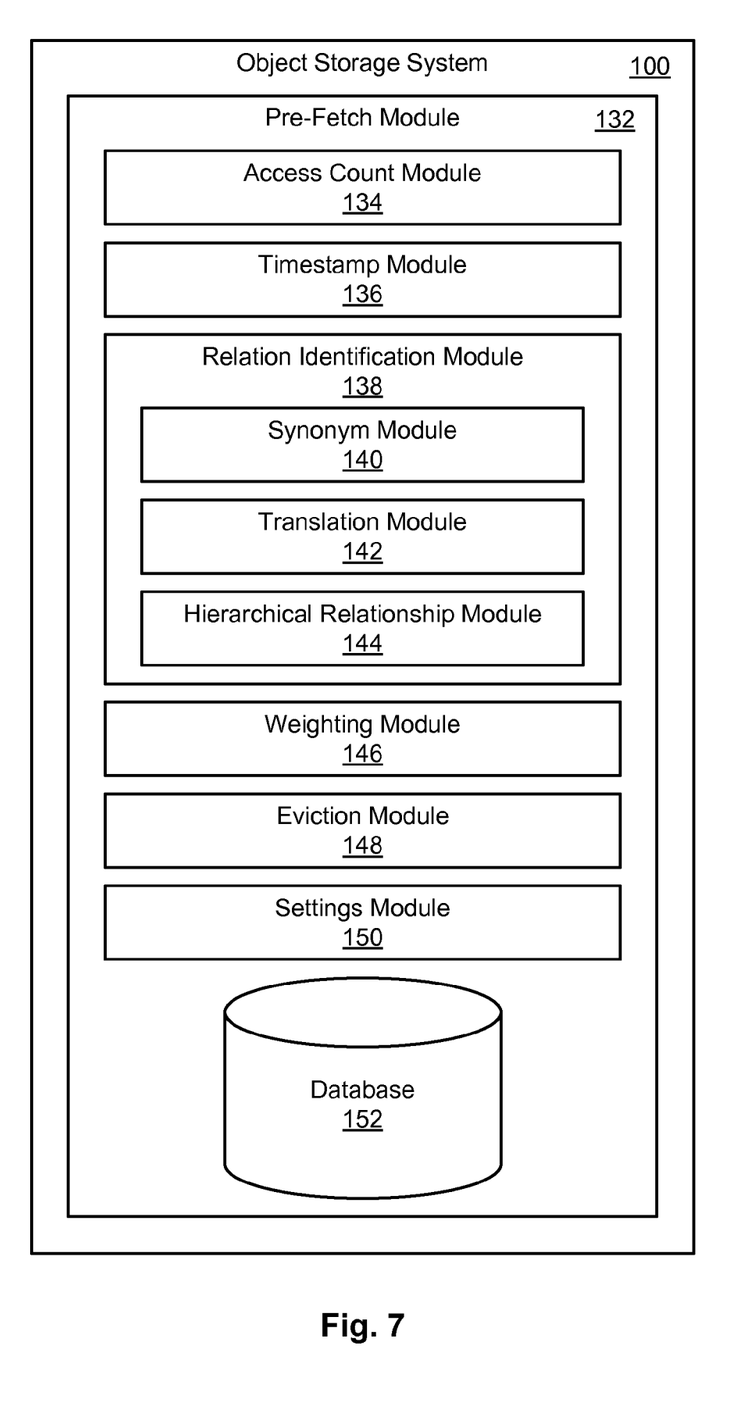
FIG. 7 is a high-level block diagram showing one embodiment of a pre-fetch module in accordance with the invention.

Referring to FIG. 7, various modules that may be included in an object storage system 100 in accordance with the invention are shown. These modules may be implemented in hardware, software or firmware executable on hardware, or a combination thereof. The modules are presented by way of example and not limitation. Indeed, alternative embodiments may include additional or fewer modules than those illustrated, or the modules may be organized differently. In other cases, the functionality of some modules may be broken into multiple modules or, conversely, the functionality of several modules may be combined into a single or fewer modules. Where the modules are implemented may also vary in different embodiments. For example, some or all of the functionality may be implemented at a home site 102, while other functionality may be implemented at a cache site 104.

As shown, a pre-fetch module 132 in accordance with the invention may include functionality to pre-fetch objects from an object store and store them in an object cache. To accomplish this, the pre-fetch module 132 includes one or more internal modules to provide various features and functions. For example, the pre-fetch module 132 may include one or more of an access count module 134, timestamp module 136, relation identification module 138, weighting module 146, eviction module 148, and settings module 150. The relation identification module 138 may, in certain embodiments, include one or more of a synonym module 140, translation module 142, and hierarchical relationship module 144. A database 152 may be provided to store statistics or other information related to metadata tags, such as the database table 112 illustrated in FIG. 6.

The access count module 134 may maintain, in the database 152, an access count for each metadata tag in an object storage system 100. Similarly, a timestamp module 136 may record, in the database 152, a timestamp for each metadata tag each time an object 110 having the metadata tag is accessed. Other types of information, such as information related to the frequency with which objects having a given metadata tag are accessed, may also be recorded and stored in the database 152 as needed.

A relation identification module 138 may identify objects that are related to accessed objects by analyzing and finding relationships between their metadata tags. For example, a synonym module 140 may find synonyms of metadata tags of accessed objects in order to identify metadata tags of related objects. A translation module 142 may translate the metadata tags of accessed objects in order to identify metadata tags of related objects. A hierarchical relationship module 144 may find hierarchical relationships between the metadata tags of accessed objects and the metadata tags of other related objects.

In certain embodiments, a weighting module 146 may be used to determine the strength of relationships between objects. For example, objects with the same metadata tag values may be considered strongly related while those having metadata tag values that are weak synonyms of one other may be considered weakly related. The strength of the relationship may be represented by a weight value, ranking, or the like. This may be useful, for example, when a user wishes to cache only more strongly related objects, while not caching more weakly related objects. In certain embodiments, a user may set a threshold weight value or level to specify which objects are cached and which are not.

An eviction module 148 may be configured to evict or destage objects from a cache site 104. The eviction module 148 may be configured to implement various different eviction policies. For example, if objects having specific metadata tags are not accessed for a specific amount of time, the eviction module 148 may be configured to initially evict objects with weakly related metadata tags (e.g., objects having metadata tags which are synonyms, hierarchically related, etc.), followed by objects with more moderately related metadata tags (e.g., objects having metadata tags which are translations, etc.), followed by objects with more strongly related metadata tags (e.g., objects having metadata tags that are identical, etc.). Other eviction policies are also possible and within the scope of the invention. In certain embodiments, options may be provided to enable a user to establish a desired eviction policy.

A settings module 150 may enable a user to establish settings or policies for the object storage system 100. For example, the settings module 150 may enable a user to enable or disable WAN caching or establish policies related to the WAN caching. As an example, the user may designate thresholds such as a number of accesses, timestamp for accesses, frequency of accesses, or the like that that will trigger WAN caching for related objects. The settings module 150 may also enable a user to establish WAN caching for the top N most highly used, recently used, or frequently used metadata tags, wherein N is a user-tunable value. In other embodiments, a user could designate whether exact matches, synonyms, translations, hierarchical relationships, or the like, should be used to find related objects for WAN caching purposes. In yet other embodiments, the settings module 150 may enable a user to specify metadata tag values for which WAN caching is enabled. The settings module 150 may also enable a user to establish weight thresholds (indicating the strength of relationships) for objects that are to be cached. These represent just a few policies or settings that a user may establish or tune through the settings module 150 and are not intended to be limiting.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method for pre-fetching objects from an object store for storage in an object cache, the method comprising:
    monitoring access to objects stored in a flat address space of an object store;
    maintaining a database for metadata tags associated with the objects;
    keeping track of a number of object accesses per metadata tag, wherein keeping track comprises monitoring access to a plurality of objects having the metadata tag, and incrementing the number each time any of the plurality of objects is accessed; and
    in the event a threshold number of object accesses for a particular metadata tag is reached, promoting, from the object store to an object cache, objects having a related metadata tag that is different from but related to the particular metadata tag.

2. The method of claim 1, wherein the threshold number is a number that places the particular metadata tag in a top N most highly used metadata tags.

3. The method of claim 1, further comprising recording a timestamp per metadata tag, the timestamp indicating a last time an object having the metadata tag was accessed.

4. The method of claim 1, further comprising deriving the related metadata tag from a synonym of the particular metadata tag.

5. The method of claim 1, further comprising deriving the related metadata tag from a translation of the particular metadata tag.

6. The method of claim 1, wherein the related metadata tag is hierarchically related to the particular metadata tag.

7. The method of claim 1, further comprising assigning a weight to a relationship between the particular metadata tag and the related metadata tag.

8. The method of claim 7, wherein promoting objects having the related metadata tag comprises only promoting the objects if the weight meets a threshold.

9. The method of claim 7, further comprising evicting objects from the object cache based on the weight.

10. A computer program product for pre-fetching objects from an object store for storage in an object cache, the computer program product comprising a computer-readable storage medium storing computer-readable program instructions configured to perform the following when executed by at least one processor:
    monitor access to objects stored in a flat address space of an object store;
    maintain a database for metadata tags associated with the objects;
    keep track of a number of object accesses per metadata tag, wherein keeping track comprises monitoring access to a plurality of objects having the metadata tag, and incrementing the number each time any of the plurality of objects is accessed; and
    in the event a threshold number of object accesses for a particular metadata tag is reached, promote, from the object store to an object cache, objects having a related metadata tag that is different from but related to the particular metadata tag.

11. The computer program product of claim 10, wherein the threshold number is a number that places the particular metadata tag in a top N most highly used metadata tags.

12. The computer program product of claim 10, wherein the computer-readable program instructions are further configured to record a timestamp per metadata tag, the timestamp indicating a last time an object having the metadata tag was accessed.

13. The computer program product of claim 10, wherein the computer-readable program instructions are further configured to derive the related metadata tag from one of a synonym of the particular metadata tag, a translation of the particular metadata tag, and a hierarchical relationship to the particular metadata tag.

14. The computer program product of claim 10, wherein the computer-readable program instructions are further configured to assign a weight to a relationship between the particular metadata tag and the related metadata tag.

15. The computer program product of claim 14, wherein promoting objects having the related metadata tag comprises only promoting the objects if the weight meets a threshold.

16. The computer program product of claim 14, wherein the computer-readable program instructions are further configured to evict objects from the object cache based on the weight.

17. An apparatus for pre-fetching objects from an object store for storage in an object cache, the system comprising:
    at least one processor;
    at least one memory device coupled to the at least one processor and storing instructions for execution on the at least one processor, the instructions enabling the at least one processor to:
        monitor access to objects stored in a flat address space of an object store;
        maintain a database for metadata tags associated with the objects;
        keep track of a number of object accesses per metadata tag, wherein keeping track comprises monitoring access to a plurality of objects having the metadata tag, and incrementing the number each time any of the plurality of objects is accessed; and
        in the event a threshold number of object accesses for a particular metadata tag is reached, promote, from the object store to an object cache, objects having a related metadata tag that is different from but related to the particular metadata tag.

18. The system of claim 17, wherein the instructions further enable the at least one processor to assign a weight to a relationship between the particular metadata tag and the related metadata tag.

19. The system of claim 18, wherein promoting objects having the related metadata tag comprises only promoting the objects if the weight meets a threshold.

20. The system of claim 18, wherein the instructions further enable the at least one processor to evict objects from the object cache based on the weight.

* * * * *